US012603112B2

(12) United States Patent
Li

(10) Patent No.: US 12,603,112 B2
(45) Date of Patent: Apr. 14, 2026

(54) VIDEO GENERATION METHOD, APPARATUS, DEVICE, AND STORAGE MEDIUM

(71) Applicant: Beijing Zitiao Network Technology Co., Ltd., Beijing (CN)

(72) Inventor: Xinwei Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/391,576

(22) Filed: Dec. 20, 2023

(65) Prior Publication Data

US 2024/0127859 A1 Apr. 18, 2024

Related U.S. Application Data

(63) Continuation of application No. PCT/CN2023/116765, filed on Sep. 4, 2023.

(30) Foreign Application Priority Data

Sep. 2, 2022 (CN) .......................... 202211075071.9

(51) Int. Cl.
*G11B 27/031* (2006.01)
*G06F 16/732* (2019.01)

(52) U.S. Cl.
CPC ........ *G11B 27/031* (2013.01); *G06F 16/7343* (2019.01)

(58) Field of Classification Search
CPC .......................... G11B 27/031; G06F 16/7343
(Continued)

(56) References Cited

U.S. PATENT DOCUMENTS 7,352,952 B2 * 4/2008 Herberger ............ G11B 27/031
386/285
8,504,368 B2 * 8/2013 Katae ................... G11B 27/034
704/260
(Continued)

FOREIGN PATENT DOCUMENTS

CN 107832382 A 3/2018
CN 111935537 A 11/2020
(Continued)

OTHER PUBLICATIONS

European Patent Application No. 23821469.6; Office Action; dated Oct. 22, 2024; one page.
(Continued)

*Primary Examiner* — Helen Shibru
(74) *Attorney, Agent, or Firm* — BakerHostetler

(57) ABSTRACT

The present disclosure provides a video generation method, an apparatus, a device, a storage medium, and a program product, and the method includes: in response to a first instruction triggered for an input text, generating first video editing data based on the input text, in which the first video editing data includes a first video clip and an audio clip, a first target video clip among the first video clip is a vacant clip; displaying the first video clip and the audio clip on a video editing track of a video editor; in response to triggering a second instruction for the target video clip on the video editor, filling the first target video clip with a target video to obtain second video editing data; generating a first video based on the second video editing data.

19 Claims, 8 Drawing Sheets

(58) Field of Classification Search
USPC ........................................................ 386/278
See application file for complete search history.

(56)                    References Cited

U.S. PATENT DOCUMENTS

|                  |      |         |                            |
| ---------------- | ---- | ------- | -------------------------- |
| 8,732,221 B2 *   | 5/2014  | Herberger ............ | G11B 27/036 |
|                  |      |         | 715/777                    |
| 9,177,603 B2 *   | 11/2015 | Bailey ................ | H04N 21/4825 |
| 10,121,187 B1    | 11/2018 | Nair    |                            |
| 11,763,099 B1 *  | 9/2023  | Oh ......................... | G06F 40/47 |
|                  |      |         | 704/3                      |
| 11,947,924 B2 *  | 4/2024  | Oh ......................... | G10L 25/57 |
| 12,217,470 B2 *  | 2/2025  | Saputra .................. | G06V 20/49 |
| 2005/0268279 A1 *| 12/2005 | Paulsen ..................... | G06F 8/38 |
|                  |      |         | 717/110                    |
| 2007/0260968 A1  | 11/2007 | Howard et al. |              |
| 2010/0023863 A1  | 1/2010  | Cohen-Martin |               |
| 2010/0083077 A1  | 4/2010  | Paulsen et al. |             |
| 2012/0033948 A1  | 2/2012  | Rodriguez et al. |          |
| 2012/0177345 A1  | 7/2012  | Trainer et al. |            |
| 2014/0219633 A1  | 8/2014  | Chiu et al. |               |
| 2019/0104259 A1  | 4/2019  | Angquist et al. |           |
| 2024/0212718 A1 *| 6/2024  | Zheng .................... | H04N 21/44 |
| 2025/0335505 A1 *| 10/2025 | Kagoshima ........... | G06F 16/738 |

FOREIGN PATENT DOCUMENTS

| CN | 112040142 A  | 12/2020 |
| -- | ------------ | ------- |
| CN | 112423023 A  | 2/2021  |
| CN | 112579826 A  | 3/2021  |
| CN | 112929746 A  | 6/2021  |
| CN | 114390220 A  | 4/2022  |
| CN | 114827752 A  | 7/2022  |
| CN | 114998484 A  | 9/2022  |
| JP | 2005062420 A | 3/2005  |
| JP | 2007328849 A | 12/2007 |
| JP | 2011082789 A | 4/2011  |
| JP | 2021077432 A | 5/2021  |
| JP | 2022065786 A | 4/2022  |

OTHER PUBLICATIONS

European Patent Application No. 23821469.6; Extended Search Report; dated Oct. 4, 2024; 8 pages.
Notice of Reasons for Refusal for Japanese Application No. 2023-578852, mailed Dec. 10, 2024, 10 Pages.
European Patent Applicaton No. 23821469.6; Office Action—Article 94(3); dated Jun. 24, 2025; 5 pages.
European Patent Application No. 23821469.6; Office Action—Article 94(3); dated Dec. 11, 2025; 8 pages.
China Patent Application No. 202211075071.9; Office Action; dated Dec. 17, 2025; 16 pages.

* cited by examiner

90

1000

VIDEO GENERATION METHOD, APPARATUS, DEVICE, AND STORAGE MEDIUM

CROSS-REFERENCE TO RELATED APPLICATION

This application is a continuation of International Application No. PCT/CN2023/116765 filed on Sep. 4, 2023, which claims the priority to and benefits of Chinese Patent Application No. 202211075071.9, filed on Sep. 2, 2022. All the aforementioned patent applications are hereby incorporated by reference in their entireties.

TECHNICAL FIELD

The present disclosure relates to a video generation method, an apparatus, a device, and a storage medium.

BACKGROUND

With the rapid development of computer technology and mobile communication technology, various video platforms based on electronic devices have been commonly used, greatly enriching people's daily life. More and more users are willing to share their video works on video platforms for other users to watch.

A video production process includes acquiring an input text from a user, matching the input text with its corresponding video image through an intelligent matching algorithm, and synthesizing to obtain a corresponding target video based on the input text and the video image.

In the above-mentioned video production process, the video image is obtained by the intelligent matching algorithm, which may not meet the needs for personalized video production of users.

SUMMARY

In order to solve the above-mentioned technical problems, embodiments of the present disclosure provide a video generation method, an apparatus, a device, a storage medium, and a program product. Video editing data is generated based on an input text, and users can freely select image materials from the first video editing data for video editing according to their own preferences, thus the needs for personalized video production are met.

The embodiments of the present disclosure provide a video generation method, comprising:

in response to a first instruction triggered for an input text, generating first video editing data based on the input text, wherein the first video editing data comprises at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip;

importing the first video editing data in a video editor so that the at least one first video clip and the at least one audio clip are displayed on a video editing track of the video editor, wherein the first target video clip has a same track timeline interval as the target audio clip;

in response to triggering a second instruction for the first target video clip on the video editor, filling the first target video clip with a first target video based on the first video editing data, to obtain second video editing data, wherein the first target video is a video obtained based on a first target image material indicated by the second instruction; and generating a first video based on the second video editing data.

The embodiments of the present disclosure further provide a video generation apparatus, comprising:

a first video editing data determination module, configured to, in response to a first instruction triggered for an input text, generate first video editing data based on the input text, wherein the first video editing data comprises at least one first video clip and at least one audio clip, the at least one first video clip and the at least one audio clip respectively correspond to at least one text clip divided from the input text, a target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip;

a first video editing data import module, configured to import the first video editing data in a video editor so that the at least one first video clip and the at least one audio clip are displayed on a video editing track of the video editor, wherein the first target video clip has a same track timeline interval as the target audio clip;

a second video editing data determination module, configured to, in response to triggering a second instruction for the first target video clip on the video editor, fill the first target video clip with a first target video based on the first video editing data, to obtain second video editing data, wherein the first target video is a video obtained based on a first target image material indicated by the second instruction; and a first video generation module, configured to generate a first video based on the second video editing data.

The embodiments of the present disclosure further provide an electronic device, comprising:

one or more processors; and a storage apparatus, configured to store one or more programs;

the one or more programs, when executed by the one or more processors, cause the one or more processors to implement the video generation method according to any one of the embodiments of the present disclosure.

The embodiments of the present disclosure further provide a computer-readable storage medium, storing a computer program, wherein the computer program, when executed by a processor, implements the video generation method according to any one of the embodiments of the present disclosure.

The embodiments of the present disclosure further provide a computer program product, comprising a computer program or instruction, wherein the computer program or instruction, when executed by a processor, implements the video generation method according to any one of the embodiments of the present disclosure.

The embodiments of the present disclosure provide a video generation method, an apparatus, a device, a storage medium, and a program product, the method comprises: in response to a first instruction triggered for an input text, generating first video editing data based on the input text, wherein the first video editing data comprises at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; importing the first video editing data in a video editor so that the at least one first video clip and the at least one audio clip are displayed on a video editing track of the video editor, wherein the first target video clip has a same track timeline interval as the target audio clip; in response to triggering a second instruction for the first target video clip on the video editor, filling the first target video clip with a first target video based on the first video editing data, to obtain second video editing data, wherein the first target video is a video obtained based on a first target image material indicated by the second instruction; and generating a first video based on the second video editing data. According to the embodiments of the present disclosure, the first video editing data is generated based on the input text, and users can freely select image materials from the first video editing data for video editing according to their own preferences, thus the needs for personalized video production are met.

BRIEF DESCRIPTION OF DRAWINGS

The above-mentioned and other features, advantages, and aspects of the embodiments of the present disclosure will become more apparent with reference to the drawings and the following specific implementations. Throughout the drawings, identical or similar reference numerals represent identical or similar elements. It should be understood that the drawings are schematic, and components and elements are not necessarily drawn to scale.

DETAILED DESCRIPTION

Figure 1:
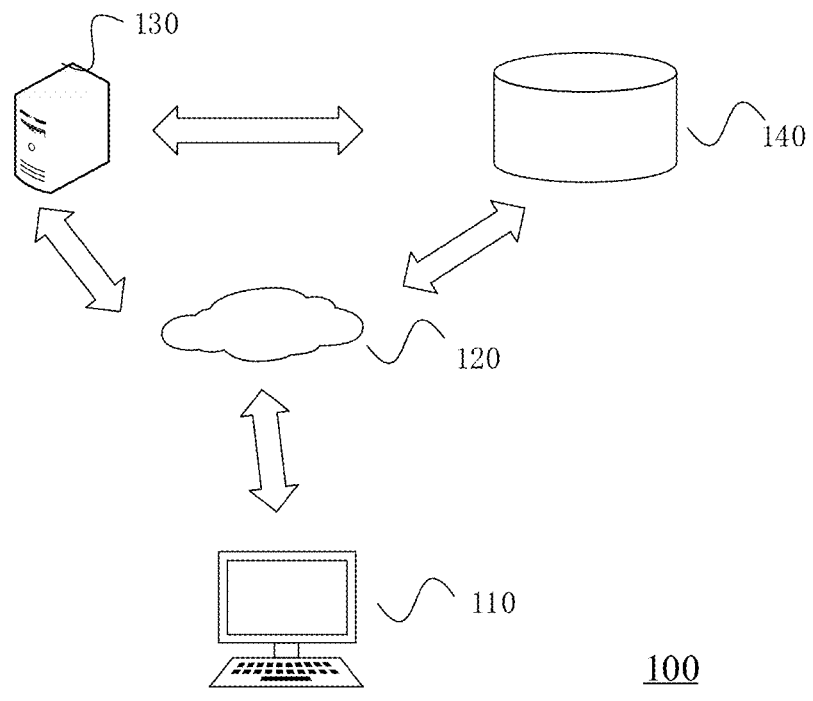
FIG. 1 is a schematic diagram of a system that can be used to implement a video generation method provided by the embodiments of the present disclosure.

Embodiments of the present disclosure will be described in more detail below with reference to the drawings. While certain embodiments of the present disclosure are illustrated in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different apparatuses, modules or units, and are not used to limit these devices, modules or units to be different apparatuses, modules or units, nor to limit the interdependence relationship or the order of functions performed by these apparatuses, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple apparatuses in the embodiments of the present disclosure are only for illustrative purposes, and are not intended to limit the scope of these messages or information.

Before the embodiments of the present disclosure are described in further detail, the terms and terminology involved in the embodiments of the present disclosure are explained, and the terms and terminology involved in the embodiments of the present disclosure are subject to the following explanations.

In related technology, a user may produce a video on a mobile terminal such as a cellphone, a tablet computer, a laptop computer, or other electronic devices. At present, the commonly used video production method is that the user prewrites an input text, but there is no suitable image or video material, in which case the user generally inputs the text, and a video production client matches the input text with its corresponding image material through an intelligent matching algorithm, and then synthesizes to obtain a corresponding target video based on the input text and the image material.

In the above-mentioned video production process, the video image is obtained by the intelligent matching algorithm, and the user cannot intervene in the image material matched by the intelligent matching algorithm, so that the matched image material may not meet the needs for personalized video production of the user. For example, the user wants to produce a video of cooking process, the user has prewritten a recipe, that is, what materials are needed, what kind of operation is performed in each step, and the user has shot the corresponding picture or small video for each material and each step. In accordance with the existing video production method, it is necessary to intelligently match image materials according to the recipe, but for example, stir-frying steps, what to put in first, and then what to put in, have a certain coherence and sequential relationship. With the current intelligent matching algorithm, it may not be possible to accurately match images that meet the user's needs.

To solve the above-mentioned technical problems, the embodiments of the present disclosure provide a video generation method, including: in response to a first instruction triggered for an input text, generating first video editing data based on the input text, in which the first video editing data includes at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; importing the first video editing data in a video editor so that the at least one first video clip and the at least one audio clip are displayed on a video editing track of the video editor, in which the first target video clip has a same track timeline interval as the target audio clip; in response to triggering a second instruction for the first target video clip on the video editor, filling the first target video clip with a first target video based on the first video editing data, to obtain second video editing data, in which the first target video is a video obtained based on a first target image material indicated by the second instruction; and generating a first video based on the second video editing data.

According to the embodiments of the present disclosure, the first video editing data is generated based on the input text, and users can freely select image materials from the first video editing data for video editing according to their own preferences, thus the needs for personalized video production are met.

In the following, the embodiments of the present disclosure will be described in detail with reference to the drawings. It should be noted that the same reference signs in different figures will be used to refer to the same elements that have been described.

FIG. 1 is a system that can be used to implement a video generation method provided by the embodiments of the present disclosure. As illustrated in FIG. 1, the system 100 may include a plurality of user terminals 110, a network 120, a server 130, and a database 140. For example, the system 100 may be used to implement a video generation method described in any one of the embodiments of the present disclosure.

It should be understood that the user terminals 110 may be any type of electronic device capable of performing data processing, which may include, but are not limited to, mobile phones, stations, units, devices, multimedia computers, multimedia tablets, Internet nodes, communicators, desktop computers, laptop computers, notebook computers, netbook computers, tablet computers, personal communication system (PCS) devices, personal navigation devices, personal digital assistants (PDA), audio/video players, digital cameras/camcorders, positioning devices, television receivers, radio broadcast receivers, e-book devices, gaming devices, or any combination thereof, including accessories and peripherals for such devices or any combination thereof.

The user may operate through applications installed on the user terminals 110, the applications transmit user behavior data to the server 130 through the network 120, and the user terminals 110 may also receive data transmitted by the server 130 through the network 120. The embodiments of the present disclosure have no limitation on hardware systems and software systems of the user terminals 110, for example, the user terminals 110 may be based on a processor such as ARM, X86, may be equipped with input/output devices such as cameras, touch screens, microphones, and may be operated with operating systems such as Windows, iOS, Linux, Android, and Harmony OS.

For example, the applications on the user terminals 110 may be video production applications, for example, video production applications based on multimedia resources such as videos, pictures, and texts. Taking the video production applications based on multimedia resources such as videos, pictures, and texts as an example, the user can perform video shooting, script creation, video production, video editing, etc., through the video production applications on the user terminals 110, and besides, can also watch or browse the videos and the like published by other users, and can perform operations such as liking, commenting, and forwarding.

The user terminals 110 may implement the video generation method provided by the embodiments of the present disclosure by running processes or threads. In some examples, the user terminals 110 may utilize their built-in applications to execute the video generation method. In other examples, the user terminals 110 may execute the video generation method by invoking applications stored externally to the user terminals 110.

The network 120 may be a single network, or a combination of at least two different networks. For example, the network 120 may include, but is not limited to, a combination of one or more of a local area network, a wide area network, a public network, a private network, and the like. The network 120 may be a computer network such as the Internet and/or various telecommunication networks (e.g., 3G/4G/5G mobile communication networks, WIFI, Bluetooth, and ZigBee). The embodiments of the present disclosure are not limited thereto.

The server 130 may be an individual server, or a cluster of servers, or a cloud server. Individual servers within the cluster of servers are connected via a wired or wireless network. A cluster of servers may be centralized, for example, a data center, or may be distributed. The server 130 may be local or remote. The server 130 may communicate with the user terminals 110 via a wired or wireless network. The embodiments of the present disclosure do not limit the hardware system and the software system of the server 130.

The database 140 may refer generically to a device having a storage function. The database 140 is primarily configured to store various data utilized, generated, and outputted by the user terminals 110 and the server 130 in the course of their work. For example, in the case where the applications on the user terminals 110 are the above-mentioned video production applications based on multimedia resources such as videos, pictures, texts, described, the data stored in the database 140 may include resource data such as videos and texts uploaded by the user through the user terminals 110, and interactive operation data such as liking, commenting, and the like.

The database 140 may be local or remote. The database 140 may include various memories, such as a random-access memory (RAM), and a read only memory (ROM), etc. The storage devices mentioned above are only examples, and the storage devices that may be used by the system 100 are not limited thereto. The embodiments of the present disclosure are not limited to the hardware system and the software system of the database 140, which may be, for example, a relational database or a non-relational database.

The database 140 may be interconnected or in communication with the server 130 or a part thereof via the network 120, or directly interconnected or in communication with the server 130, or via a combination of the above.

In some examples, the database 140 may be a stand-alone device. In some other examples, the database 140 may also be integrated in at least one of the user terminals 110 and the server 130. For example, the database 140 may be set up on the user terminals 110 or on the server 130. As another example, the database 140 may also be distributed, with a part set on the user terminals 110 and another part set on the server 130.

Figure 2:
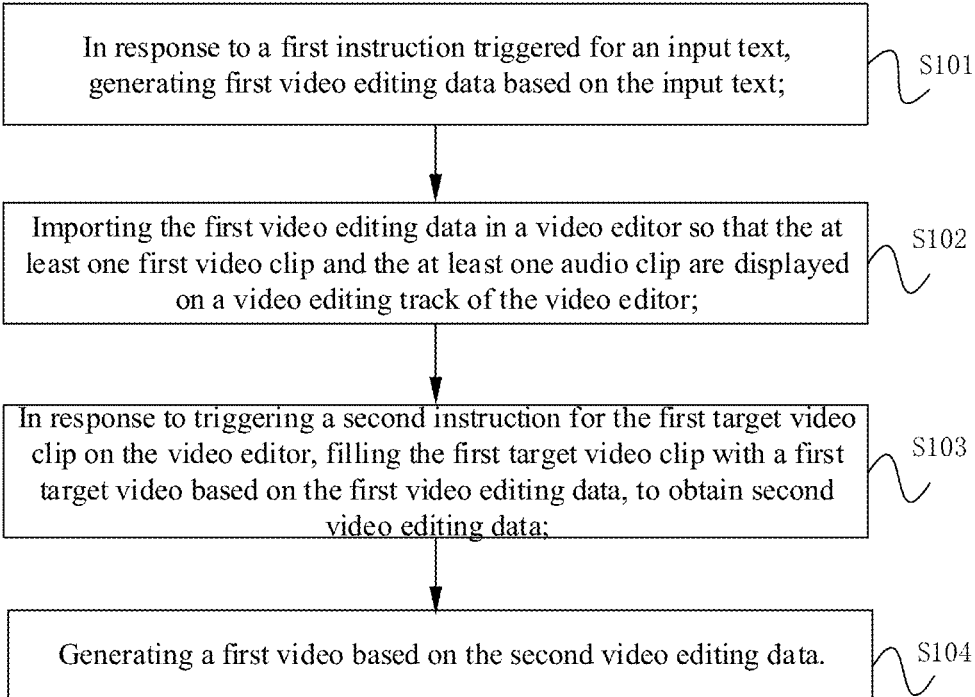
FIG. 2 is a schematic flowchart of a video generation method according to at least an embodiment of the present disclosure.

FIG. 2 is a schematic flowchart of a video generation method according to an embodiment of the present disclosure. The present embodiment is applicable to the case of generating a video based on an input text. The method may be performed by a video generation apparatus. The video generation apparatus may be implemented in software and/or hardware. The video generation method may be implemented in the system illustrated in FIG. 1.

As illustrated in FIG. 2, a video generation method provided by an embodiment of the present disclosure mainly includes steps S101-S104.

S101: in response to a first instruction triggered for an input text, generating first video editing data based on the input text, in which the first video editing data includes at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to fill be filled with a reading speech that matches the target text clip, and the first target video clip is a vacant clip.

For example, "in response to", is used to indicate a condition or state on which the performed operation depends. When the dependent condition or state is satisfied, the one or more operations performed may be in real time or have a set delay. In the absence of a particular description, there is no restriction on the order of execution of the multiple operations performed.

For example, the video editing data may be understood as a video editing draft or an editing project file for recording and reproducing the video editing process of the user, specifically including the audio and video materials for editing and instruction information of editing operations that have been performed for the audio and video materials.

In an example of the present disclosure, the first instruction may be understood as an instruction for indicating a client to generate the first video editing data based on the input text only, and does not need to intelligently match an image material based on the input text. The first instruction triggered for the input text may be in response to a user's triggering operation on a first control on a video production page.

In an example of the present disclosure, when the user wants to produce a video based on the input text, a video production application may be pre-launched, and one of subprograms included in the video production application has a function of producing a video based on the input text. It is also possible to start a video production application that produces a video based on the input text.

In an example of the present disclosure, the method further includes: displaying a video production page in response to a triggering operation on a video production control, in which the video production page includes a first control, a second control, and a text editing region, the first control is configured to trigger the first instruction in response to a triggering operation of the user, the second control is configured to trigger the third instruction in response to a triggering operation of the user, and the text editing region is configured for acquiring the input text in response to an editing operation of the user.

In the embodiments of the present disclosure, the video production application is started, and an application interface is displayed. The application interface includes a video production control. A video production page is displayed in response to a triggering operation of the user on the video production control. For example, the above-mentioned triggering operation may be one or a combination of clicking, long-press, hovering, touching, and the like, which is not limited in the embodiments of the present disclosure.

Figure 3:
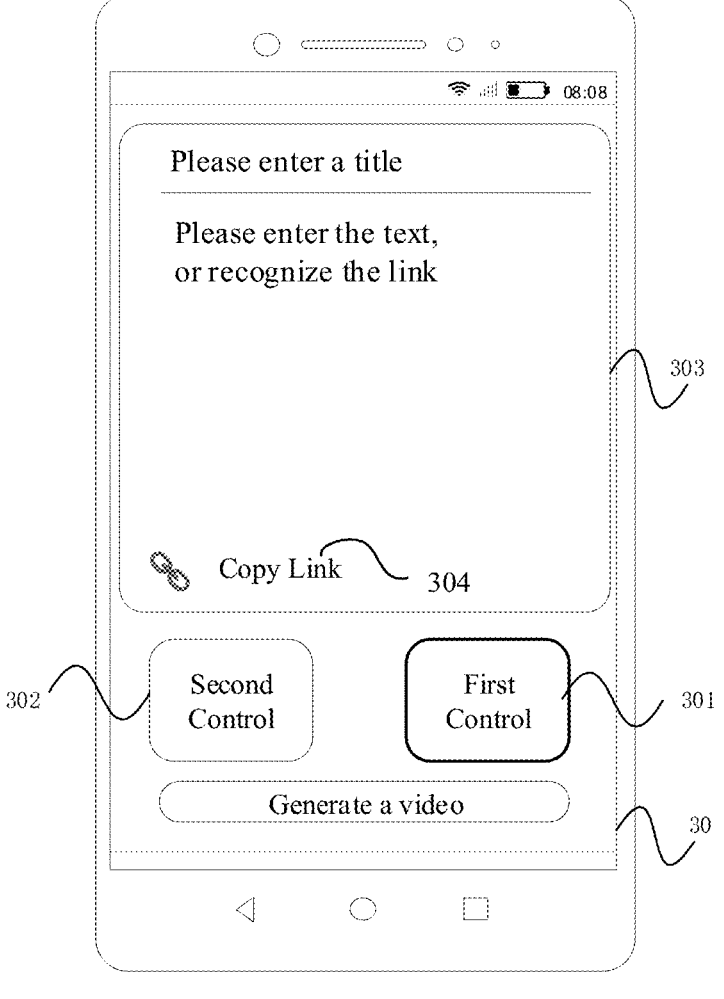
FIG. 3 is a schematic diagram of a video production page according to at least an embodiment of the present disclosure.

In the embodiments of the present disclosure, as illustrated in FIG. 3, a video production page 30 includes a first control 301, a second control 302, and a text editing region 303, the first control 301 is configured to trigger the first instruction in response to a triggering operation of the user, the second control 302 is configured to trigger the third instruction in response to a triggering operation of the user, and the text editing region 303 is configured for acquiring the input text in response to an editing operation of the user.

In the embodiments of the present disclosure, in response to the triggering operation of the user on the first control, the first instruction for the input text is triggered, and in response to the first instruction, the first video editing data is generated based on the input text. The input text is a text saved and displayed in the text editing region in response to the first instruction.

Further, in response to the triggering operation of the user on the first control, the first control is selected; in response to the triggering on the video production control included in the video production page 30, the first instruction for the input text is triggered; and in response to the first instruction, the first video editing data is generated based on the input text. The input text is a text saved and displayed in the text editing region in response to the first instruction.

In an embodiment of the present disclosure, the input text is divided into at least one text clip, a corresponding reading speech for each target text clip is obtained by intelligent matching, the target text clip and its corresponding reading speech are aligned on track timeline, to obtain a corresponding target audio clip, and a vacant clip is then acquired as a first target video clip corresponding to the text clip. The first target video clip and the target audio clip are synthesized to obtain a first video clip. The above-mentioned operation is performed for each of the target text clips to obtain a plurality of first video clips. The plurality of first video clips are synthesized in accordance with a sequential order of the target text clips in the input text so as to obtain the first video editing data.

The first target video clip, the target audio clip and the target text clip corresponding to each other can be understood as the timelines of the three above are aligned and the contents expressed are echoed. For example, the three each have a timeline form 1 minute 55 seconds to 1 minute 57 seconds. For example, the target text clip is "stir-fry on high heat", and the target audio clip is a reading speech of "stir-fry on high heat".

The first target video clip may be understood as any one of the at least one first video clips, and the first target video clip being vacant may be understood as the first target video clip being set to vacant in the first video editing data. The vacancy may refer to that the video track is vacant without setting of any image material, or it may refer to that the video track is set with a preset image material. For example, the preset image material is a system setting that the user cannot change at will, that is, regardless of the content of the input text, the corresponding first target video clip is always a preset image material. For example, the image material may be a black image. In other words, no matter what the content of the input text is, the corresponding first target video clip is always a black image.

In an example of the present disclosure, the first video editing data includes at least one subtitles clip, a target subtitles clip among the at least one subtitles clip corresponds to the target text clip among the at least one text clip, and the target subtitles clip is configured to fill text subtitles that match the target text clip.

The text subtitles that match the target text segment are added to the first target video clip, so that the user can visually see the subtitles corresponding to the reading speech when watches the video, and viewing experience of the user is improved.

S102: importing the first video editing data in a video editor so that the at least one first video clip and the at least one audio clip are displayed on a video editing track of the video editor, in which the first target video clip has the same track timeline interval as the target audio clip.

Figure 4:
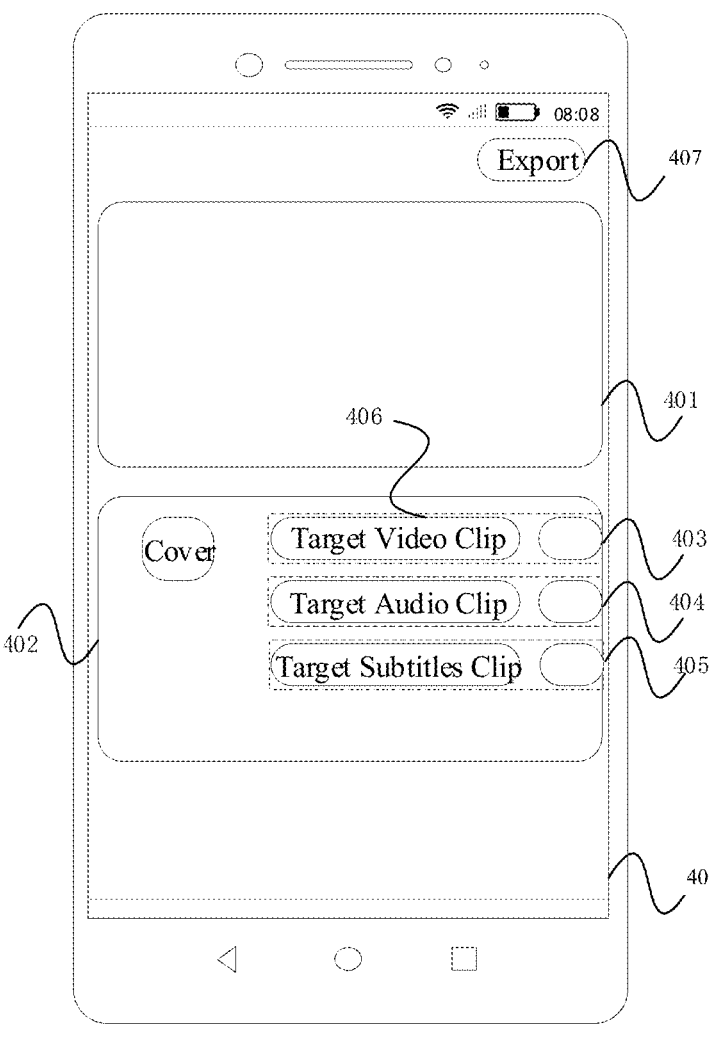
FIG. 4 is a schematic diagram of a video editing page according to at least an embodiment of the present disclosure.

In the embodiments of the present disclosure, as illustrated in FIG. 4, a video editing page 40 of the video editor mainly includes a video preview region 401 and a video editing region 402. A video editing track is displayed in the video editing region 402, and the video editing track includes a video track 403, an audio track 404, and a subtitles track 405. Further, a first video clip is imported at the video track 403, an audio clip is imported at the audio track 404, and text subtitles are imported at the subtitles track 405. The content imported on the video editing track can be edited in response to operations on the video editing track described above. For example, the audio style, e.g. sweet style and serious style can be selected in the audio track 404. Tone, contrast, etc. can also be edited in the audio track 404. That is, all the parameters related to audio can be edited on the audio track 404. Similarly, all the parameters related to the text subtitles, such as subtitles color, subtitles appearance mode, and subtitles font can also be edited on the subtitles track 405.

It should be noted that in the process of editing the above-mentioned tracks, the editing may be performed for all audio clips or for one of the target audio clips, which is not specifically limited in the embodiments of the present disclosure. In the process of editing the tracks, the editing may be performed for all subtitles clips or for one of the target subtitles clips, which is not specifically limited in the embodiments of the present disclosure.

In an example of the present disclosure, the first target video clip and the target audio clip have the same track timeline interval, for example, both are clips have a timeline from 1 minute 55 seconds to 1 minute 57 seconds.

S103: in response to triggering a second instruction for the first target video clip on the video editor, filling the first target video clip with a first target video based on the first video editing data, to obtain second video editing data, in which the first target video is a video obtained based on a first target image material indicated by the second instruction.

For example, the first target video clip may be any video clip among the at least one first video clip. Further, the first target video clip may be a video clip that the user needs to edit currently.

Figure 5:
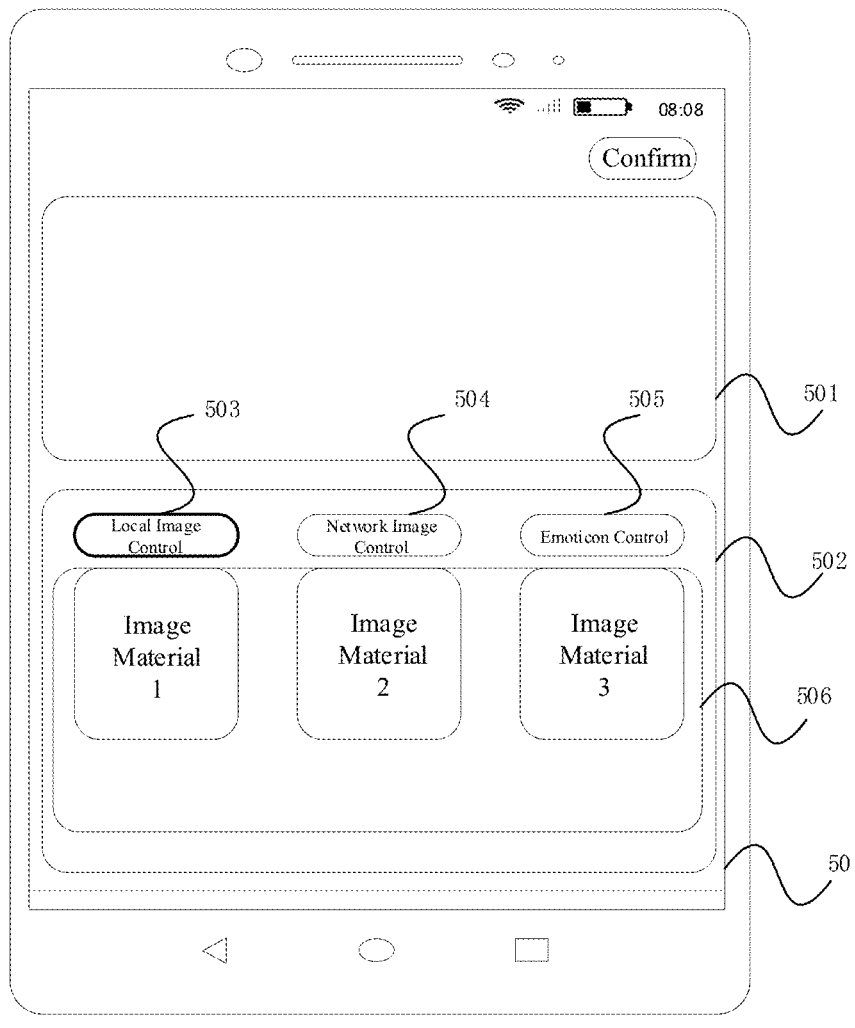
FIG. 5 is a schematic diagram of an image selection page according to at least an embodiment of the present disclosure.

In the embodiments of the present disclosure, as illustrated in FIG. 4, in response to a triggering operation for a first target video clip 406, a jump to an image selection page is made, and as illustrated in FIG. 5, an image selection page 50 includes an image preview region 501 and an image selection region 502. For example, the image selection region 502 further includes a local image control 503, a network image control 504, an emoticon control 505, and an image browsing region 506.

For example, the local image control 503 is configured to acquire an image or video from a local album for displaying in the image browsing region in response to a triggering operation of the user. The network image control 504, in response to a triggering operation of the user, pulls an image or video from a network or a corresponding database of the client for displaying in the image browsing region. The emoticon control 505 is configured to acquire frequently used emoticons or popular emoticons for displaying in the image browsing region in response to a triggering operation of the user. The image browsing region 506 is configured to display a plurality of images or small videos in an up-and-down moving manner in response to an up-and-down sliding operation of the user. Further, the image browsing region 506 is further configured to determine an image corresponding to the triggering operation as a first target image material in response to the triggering operation of the user, and display the first target image material in the image browsing region 501 for the user to preview.

Further, the image selection page 50 further includes a shooting control. The shooting control is configured to call a camera in a terminal for shooting in response to an operation of the user to obtain the first target image material.

Further, the first target image material may be a picture or a video. If the first target image material is a picture, a technique of generating a video from pictures may be used to process the picture to obtain a first target video. For example, camera movements for pictures or a freeze-frame video. If the first target image material is a video, and the duration of the video is inconsistent with the duration of the target video clip, the video can be clipped into a video having the same duration as the target video clip; and if the duration of the video is consistent with the duration of the target video clip, the video can be directly clipped to fill in the first target video clip.

S104: generating a first video based on the second video editing data.

In the embodiments of the present disclosure, in response to a triggering operation for video generation, the first video is generated based on the second video editing data. The triggering operation for video generation may refer to a triggering operation on an export control 407 in the video editing page 40. For example, an exporting method may refer to locally saving the first video, or sharing to other video sharing platforms or websites. No further specific limitations will be made in the embodiments of the present disclosure.

On the basis of the above-mentioned embodiments, the method further includes: in response to a third instruction triggered for the input text, generating third video editing data based on the input text, in which the third video editing data includes at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip; importing the third video editing data in the video editor so that the at least one second video clip and the at least one audio clip are displayed on the video editing track of the video editor, wherein the second target video clip has the same track timeline interval as the target audio clip; and generating a second video based on the third video editing data.

For example, the third instruction is an instruction for intelligently matching image materials for the input text so as to generate the first video data. The second target image material is matched based on the target text clip, which is an image material matched to the target text clip by an intelligent matching algorithm.

In an example of the present disclosure, after the third video editing data is obtained, in response to a triggering operation for video generation, a target video is generated based on the edited third video editing data.

In an example of the present disclosure, after the third video editing data is obtained, the third video editing data can also be imported into the video editor for editing, and the specific editing method may be referred to the description in the above-mentioned embodiments, which will not be repeated in the embodiments of the present disclosure. After the third video editing data is edited, then in response to the triggering operation for video generation, a target video is generated based on the edited third video editing data.

The embodiments of the present disclosure provide a video generation method, including: in response to a first instruction triggered for an input text, generating first video editing data based on the input text, in which the first video editing data includes at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; importing the first video editing data in a video editor so that the at least one first video clip and the at least one audio clip are displayed on a video editing track of the video editor, in which the first target video clip has the same track timeline interval as the target audio clip; in response to triggering a second instruction for the first target video clip on the video editor, filling the first target video clip with a first target video based on the first video editing data, to obtain second video editing data, in which the first target video is a video obtained based on a first target image material indicated by the second instruction; and generating a first video based on the second video editing data. According to the embodiments of the present disclosure, the first video editing data is generated based on the input text, and users can freely select image materials from the first video editing data for video editing according to their own preferences, thus the needs for personalized video production are met.

On the basis of the above-mentioned embodiments, several methods of acquiring the input text via the video production page 30 in response to an editing operation of the user are provided in the embodiments of the present disclosure, as follows.

In an example of the present disclosure, acquiring the input text in response to an editing operation of a user includes: displaying a text input page in response to a triggering operation on the text editing region; and acquiring, in response to an input operation on the text input page, the input text corresponding to the input operation.

Figure 6:
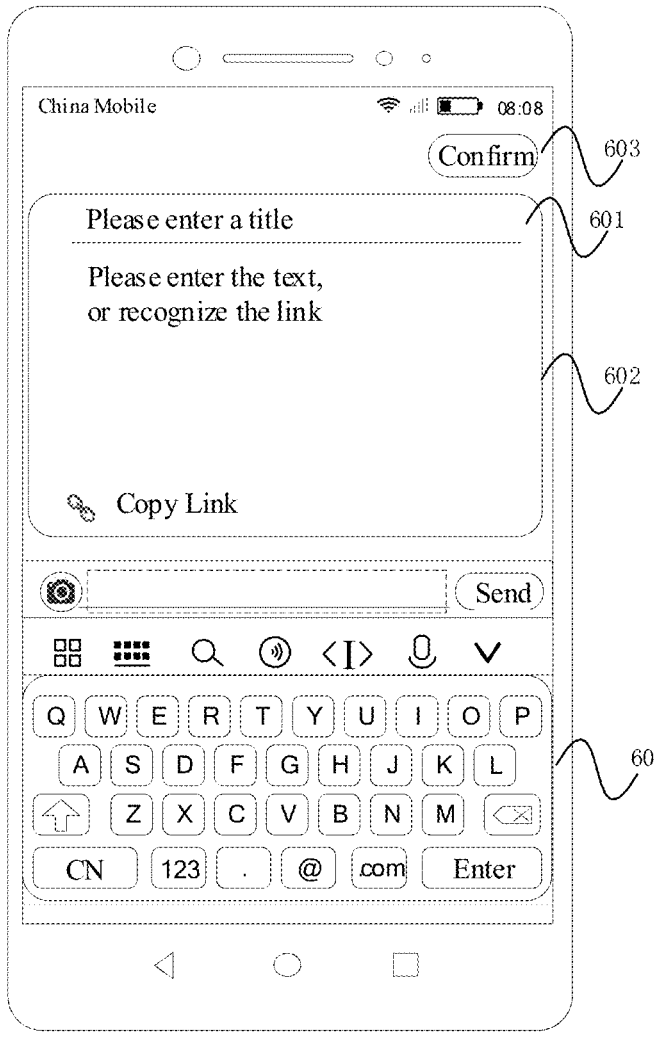
FIG. 6 is a schematic diagram of a text editing page according to at least an embodiment of the present disclosure.

In the embodiments of the present disclosure, as illustrated in FIG. 3, in response to the triggering operation on the text editing region, a text input page is displayed. As illustrated in FIG. 6, a text input page 60 includes a title editing region 601, a content editing region 602, and an editing completion control 603.

For example, in response to the operation of the user through a virtual keyboard, a physical keyboard, etc. on a terminal, the text input by the user may be acquired in both the title editing region 601 and the content editing region 602. Without limiting the above-mentioned input methods in the embodiments of the present disclosure, input text acquisition methods such as recognizing a text in a picture by OTC, recognizing voice recorded by the user through voice recognition to obtain the input text are all within the scope of protection of the present disclosure.

Further, in response to a triggering operation on the editing completion control 603, the input text in the title editing region 601 and the content editing region 602 is acquired as an input text in the text editing region, and a jump to the video production page 30 is made.

In an example of the present disclosure, the text editing region includes a network address copy control, and acquiring the input text in response to an editing operation of the user includes: displaying a network address enter region in response to a triggering operation on the network address copy control; receiving, in response to an input operation on the network address enter region, a network address corresponding to the input operation; and acquiring the input text corresponding to the network address.

Figure 7:
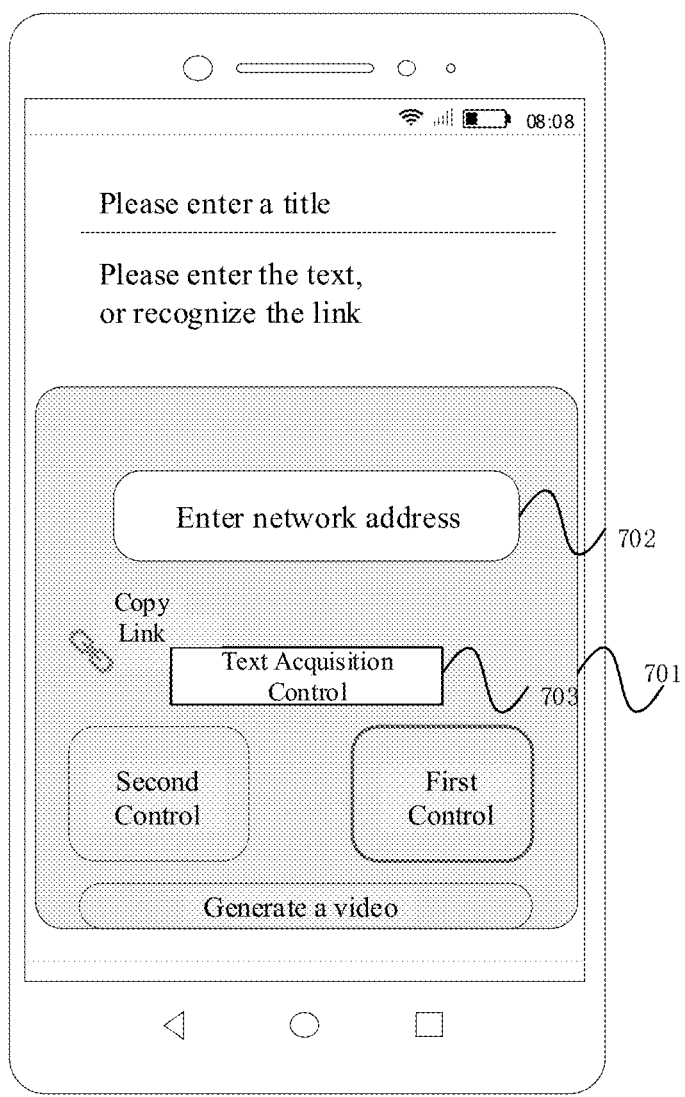
FIG. 7 is a schematic diagram of a network address recognition page according to at least an embodiment of the present disclosure.

In the embodiments of the present disclosure, as illustrated in FIG. 3, a network address copy control 304 is included in the text editing region 303. In response to a triggering operation on the network address copy control, a mask region 701 is displayed, as illustrated in FIG. 7. The mask region 701 includes a network address input region 702. In this mask region 701, the user may enter an address in the network address input region 702 by keyboard entry or may enter an address in the network address input region 702 by copy and paste.

Further, in response to a triggering operation on a text acquisition control 703 included in the mask region 701, the network address in the network address input region 702 is received and the web page content corresponding to the network address is used as the input text in the text editing region 303.

In an example of the present disclosure, acquiring the input text corresponding to the network address includes: determining whether an original input text exists in the text editing region; and if the original input text exists in the text editing region, deleting the original input text and acquiring the input text corresponding to the network address.

In the embodiments of the present disclosure, the original input text refers to the input text entered in the text editing region before pulling back the web content corresponding to the web address. It is determined whether the original input text exists in the text editing region, and if the original input text exists in the text editing region, a prompt floating window is displayed and used to prompt the user whether or not to delete the original input text that exists in the text editing region. In response to a triggering operation on an input text deletion control, the original input text is deleted and the input text corresponding to the network address is acquired. In response to a triggering operation on a cancel control, no processing will be performed on the original input text, that is, the original input text remains in the text editing region.

In the embodiments of the present disclosure, the original input text refers to the input text entered in the text editing region before pulling back the web content corresponding to the web address. It is determined whether the original input text exists in the text editing region, and if the original input text exists in the text editing region, the user is prompted to select an insertion position of the input text corresponding to the network address. Based on a selection operation of the user, the input text corresponding to the network address is inserted to the corresponding position of the original input text.

In an example of the present disclosure, after in response to a triggering operation on the video production control, the method further includes: acquiring a network address carried on a clipboard; acquiring an input text corresponding to the network address; and displaying a video production page, in which the video production page includes a text editing region for displaying the input text corresponding to the network address.

Figure 8:
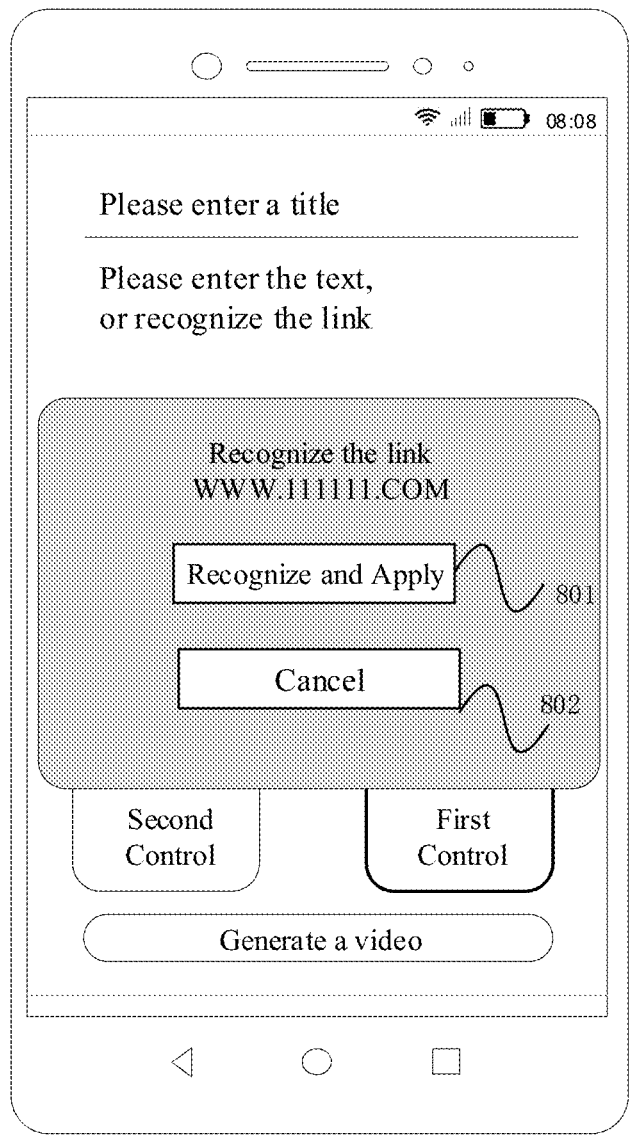
FIG. 8 is a schematic diagram of another network address recognition page according to at least an embodiment of the present disclosure.

In an example of the present disclosure, in response to a triggering operation on the video production control, a network address carried on a clipboard is detected and acquired. As illustrated in FIG. 8, if the network address is carried, a prompt box is displayed, which is used to display the carried network address and to prompt the user whether to recognize the content of the web page corresponding to the network address. In response to a triggering operation on a confirmation control 801 in the prompt box, the network address is received and the web page content corresponding to the web address is used as the input text in the text editing region 303. In response to a triggering operation on a cancel control 802 in the prompt box, the network address is directly ignored, a jump to a text acquisition interface is made, at this time, there is no input text in the text editing region 303 in the text acquisition interface.

In the embodiments of the present disclosure, a variety of input text input methods are set up according to different situations, which is convenient for the user to select.

Figure 9:
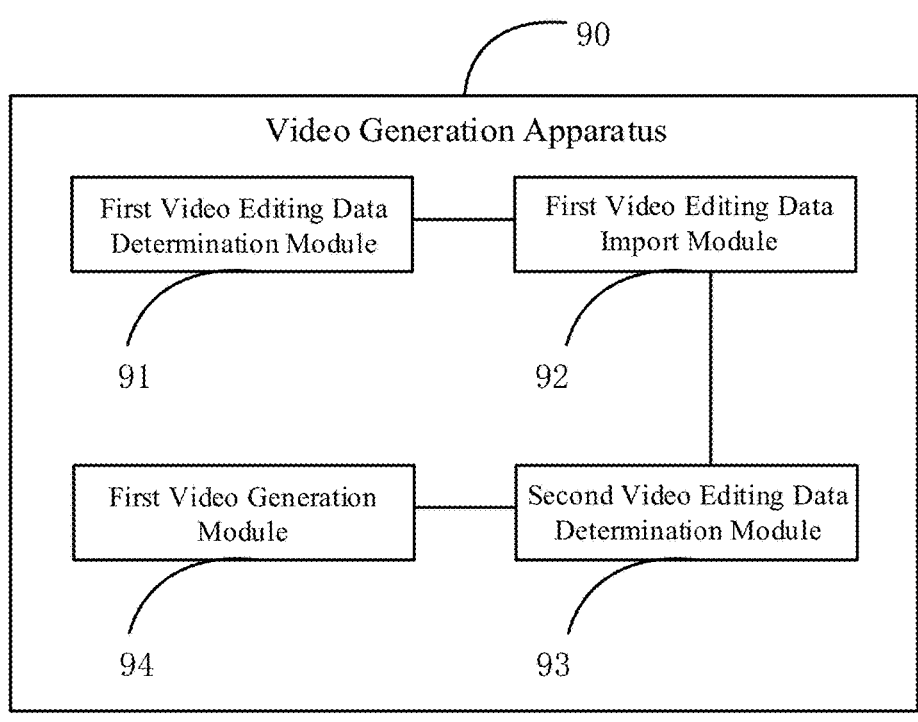
FIG. 9 is a schematic structural diagram of a video generation apparatus according to at least an embodiment of the present disclosure.

FIG. 9 is a schematic structural diagram of a video generation apparatus according to at least an embodiment of the present disclosure. The embodiment is applicable to the situation of generating a video based on an input text. The video generation apparatus may be implemented in software and/or hardware.

As illustrated in FIG. 9, a video generation apparatus 90 provided by the embodiments of the present disclosure mainly includes a first video editing data determination module 91, a first video editing data import module 92, a second video editing data determination module 93, and a first video generation module 94.

For example, the first video editing data determination module 91 is configured to, in response to a first instruction triggered for an input text, generate first video editing data based on the input text, the first video editing data includes at least one first video clip and at least one audio clip, the at least one first video clip and the at least one audio clip respectively correspond to at least one text clip divided from the input text, a target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip. The first video editing data import module 92 is configured to import the first video editing data in a video editor so that the at least one first video clip and the at least one audio clip are displayed on a video editing track of the video editor, and the first target video clip has the same track timeline interval as the target audio clip. The second video editing data determination module 93 is configured to, in response to triggering a second instruction for the first target video clip on the video editor, fill the first target video clip with a first target video based on the first video editing data, to obtain second video editing data, and the first target video is a video obtained based on a first target image material indicated by the second instruction. The first video generation module 94 is configured to generate a first video based on the second video editing data.

In an example of the present disclosure, the first video editing data includes at least one subtitles clip, a target subtitles clip in the at least one subtitles clip corresponds to the target text clip in the at least one text clip, and the target subtitles clip is configured to fill text subtitles that match the target text clip.

In an example of the present disclosure, the apparatus further includes: a third video editing data generation module, which is configured to, in response to a third instruction triggered for the input text, generate third video editing data based on the input text; the third video editing data includes at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip; a third video editing data import module, which is configured to import the third video editing data in the video editor so that the at least one second video clip and the at least one audio clip are displayed on the video editing track of the video editor, the second target video clip has the same track timeline interval as the target audio clip; and a second video generation module, which is configured to generate a second video based on the third video editing data.

In an example of the present disclosure, the apparatus further includes a video production page display module, which is configured to display a video production page in response to a triggering operation on a video production control. The video production page includes a first control, a second control, and a text editing region, the first control is configured to trigger the first instruction in response to a triggering operation of a user, the second control is configured to trigger the third instruction in response to a triggering operation of a user, and the text editing region is configured for acquiring the input text in response to an editing operation of a user.

In an example of the present disclosure, acquiring the input text in response to an editing operation of a user includes: displaying a text input page in response to a triggering operation on the text editing region; and acquiring, in response to an input operation on the text input page, the input text corresponding to the input operation.

In an example of the present disclosure, the text editing region includes a network address copy control, and acquiring the input text in response to an editing operation of a user includes: displaying a network address enter region in response to a triggering operation on the network address copy control; receiving, in response to an input operation on the network address enter region, a network address corresponding to the input operation; and acquiring the input text corresponding to the network address.

In an example of the present disclosure, acquiring the input text corresponding to the network address includes: determining whether an original input text exists in the text editing region; and if the original input text exists in the text editing region, deleting the original input text and acquiring the input text corresponding to the network address.

In an example of the present disclosure, after in response to a triggering operation on the video production control, the method further includes: acquiring a network address carried on a clipboard; acquiring an input text corresponding to the network address; and displaying a video production page, in which the video production page includes a text editing region for displaying the input text corresponding to the network address.

The video generation apparatus provided in the embodiments of the present disclosure may perform the steps of the video generation method provided in the method embodiments of the present disclosure, and the steps and the beneficial effects thereof will not be repeated herein.

Figure 10:
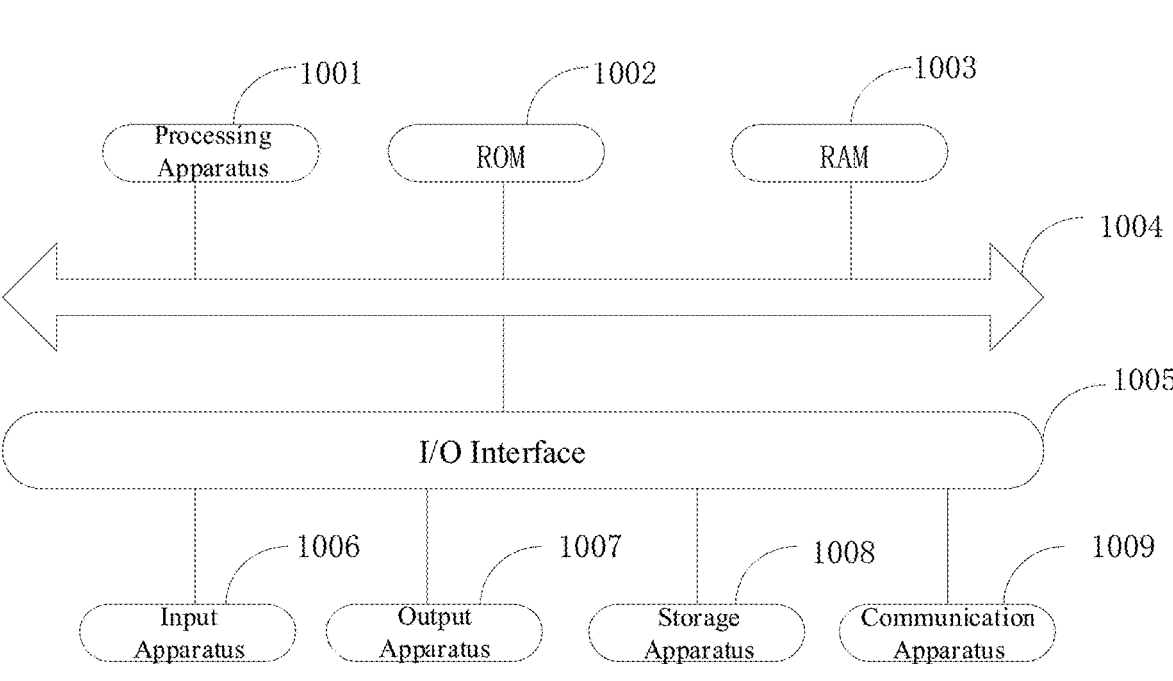
FIG. 10 is a schematic structural diagram of an electronic device according to at least an embodiment of the present disclosure.

FIG. 10 is a schematic structural diagram of an electronic device according to at least an embodiment of the present disclosure. Specific reference is made below to FIG. 10, which illustrates a schematic structural diagram of an electronic device 1000 applicable to implementing the embodiments of the present disclosure. The electronic device 1000 in the embodiments of the present disclosure may include, but is not limited to, a mobile terminal such as a cellphone, a laptop computer, a digital broadcast receiver, a PDA (personal digital assistant), a PAD (tablet computer), a PMP (portable multimedia player), a vehicle-mounted terminal (e.g., a vehicle navigation terminal), and a wearable terminal device, as well as a fixed terminal such as a digital TV, a desktop computer, and a smart home device. The electronic device illustrated in FIG. 10 is merely an example and should not impose any limitations on the function and scope of application of the embodiments of the present disclosure.

As illustrated in FIG. 10, the electronic device 1000 may include a processing apparatus 1001 (e.g., a central processor, a graphics processor, etc.) that may perform various appropriate actions and processes based on a program stored in a read-only memory (ROM) 1002 or loaded from a storage apparatus 1008 into a random access memory (RAM) 1003, so as to implement the video generation method according to the embodiments of the present disclosure. Various programs and data necessary for operations of the terminal device 1000 are also stored in the RAM 1003. The processing apparatus 1001, the ROM 1002, and the RAM 1003 are connected to each other through a bus 1004. An input/output (I/O) interface 1005 is also connected to the bus 1004.

Typically, the following apparatuses may be connected to the I/O interface 1005: an input apparatus 1006 including, for example, a touch screen, a touch pad, a keyboard, a mouse, a camera, a microphone, an accelerometer, a gyroscope, and the like; an output apparatus 1007 including, for example, a liquid crystal display (LCD), a loudspeaker, a vibrator, and the like; a storage apparatus 1008 including, for example, a magnetic tape, and a hard disk; and a communication apparatus 1009. The communication apparatus 1009 may allow the electronic device 1000 to communicate wirelessly or wiredly with other devices to exchange data. While FIG. 10 illustrates the electronic device 1000 with various apparatuses, it should be understood that it is not required to implement or have all of the illustrated apparatuses. More or fewer apparatuses may alternatively be implemented or possessed.

Particularly, according to the embodiments of the present disclosure, the process described above with reference to the flowchart may be implemented as a computer software program. For example, the embodiments of the present disclosure provide a computer program product which includes a computer program loaded on a non-transitory computer-readable medium. The computer program includes a program code for performing the method illustrated in the flowchart, thereby implementing the video generation method as described above. In such embodiments, the computer program may be downloaded and installed from a network via the communication apparatus 1009, or from the storage apparatus 1008, or from the ROM 1002. When this computer program is executed by the processing apparatus 1001, the above-described functions defined in the method of the embodiments of the present disclosure are performed.

It should be noted that the computer-readable medium of the present disclosure described above may be a computer-readable signal medium or a computer-readable storage medium or any combination thereof. The computer-readable storage medium may be, for example, but is not limited to, a system, device, or apparatus or component that is electrical, magnetic, optical, electromagnetic, infrared, or semi-conducting, or any combination of the above. More specific examples of the computer-readable storage medium may include, but are not limited to, a portable computer disk electrically connected with one or more wires, a hard disk, a random-access memory (RAM), a read-only memory (ROM), an erasable programmable read-only memory (EPROM or flash memory), a fiber optic, a portable compact disk read-only memory (CD-ROM), an optical storage device, a magnetic memory device, or any suitable combination of the foregoing. In the context of the present disclosure, the computer-readable storage medium may be any tangible medium that contains or stores a program that may be used by or in combination with an instruction execution system, apparatus, or device. Moreover, in the context of the present disclosure, the computer-readable signal medium may include a data signal propagated in a baseband or as part of a carrier, the data signal carrying a computer-readable program code. Such propagated data signal may have a variety of forms, including, but not limited to, an electromagnetic signal, an optical signal, or any suitable combination of the foregoing. The computer-readable signal medium may also be any computer-readable medium other than the computer-readable storage medium that sends, propagates, or transmits a program for use by, or in combination with, an instruction executing system, apparatus, or device. The program code contained on the computer-readable medium may be transmitted using any suitable medium including, but not limited to, an electric wire, a fiber optic cable, RF (radio frequency), etc., or any suitable combination of the foregoing.

In some examples, the client and the server may communicate utilizing any currently known or future developed network protocol such as HTTP (Hyper Text Transfer Protocol) and may be interconnected in communication with digital data (e.g., communication networks) of any form or medium. Examples of communication networks include a local area network ("LAN"), a wide area network ("WAN"), an inter-network (e.g., the Internet), and an end-to-end network (e.g., ad hoc end-to-end network), as well as any currently known or future developed networks.

The computer-readable medium described above may be included in the electronic device described above; or it may stand alone and not be assembled into that electronic device.

The computer-readable medium described above carries one or more programs. When the one or more programs are executed by a terminal device, the terminal device is allowed to perform the following operations: in response to a first instruction triggered for an input text, generating first video editing data based on the input text, in which the first video editing data includes at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; importing the first video editing data in a video editor so that the at least one first video clip and the at least one audio clip are displayed on a video editing track of the video editor, in which the first target video clip has the same track timeline interval as the target audio clip; in response to triggering a second instruction for the first target video clip on the video editor, filling the first target video clip with a first target video based on the first video editing data, to obtain second video editing data, in which the first target video is a video obtained based on a first target image material indicated by the second instruction; and generating a first video based on the second video editing data.

Optionally, when one or more of the programs are executed by the terminal device, the terminal device may also perform other steps described in the above-mentioned embodiments.

Computer program codes for performing the operations of the present disclosure may be written in one or more programming languages or combinations thereof. The programming languages include, but are not limited to, object oriented programming languages such as Java, Smalltalk, C++, and further include conventional procedural programming languages such as the "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider).

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of codes, the module, program segment, or part of codes including one or a plurality of executable instructions for implementing specified logical functions. It should also be noted that in some alternative implementations, functions marked in the blocks may also occur in an order different from that marked in the drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or operations, or using a combination of special hardware and computer instructions.

The units described in the embodiments of the present disclosure may be implemented by software or may be implemented by hardware. Names of the units do not constitute limitations on the units themselves in a particular case.

The functions described herein above may be performed, at least in part, by one or a plurality of hardware logic components. For example, without limitation, example hardware logic components that may be used include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

According to one or more embodiments of the present disclosure, the present disclosure provides a video generation method, including: in response to a first instruction triggered for an input text, generating first video editing data based on the input text, in which the first video editing data includes at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; importing the first video editing data in a video editor so that the at least one first video clip and the at least one audio clip are displayed on a video editing track of the video editor, in which the first target video clip has the same track timeline interval as the target audio clip; in response to triggering a second instruction for the first target video clip on the video editor, filling the first target video clip with a first target video based on the first video editing data, to obtain second video editing data, in which the first target video is a video obtained based on a first target image material indicated by the second instruction; and generating a first video based on the second video editing data.

According to one or more embodiments of the present disclosure, the present disclosure provides a video generation method, the first video editing data includes at least one subtitles clip, a target subtitles clip among the at least one subtitles clip corresponds to the target text clip among the at least one text clip, and the target subtitles clip is configured to fill text subtitles that match the target text clip.

According to one or more embodiments of the present disclosure, the present disclosure provides a video generation method. The method further includes: in response to a third instruction triggered for the input text, generating third video editing data based on the input text, in which the third video editing data includes at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip; importing the third video editing data in the video editor so that the at least one second video clip and the at least one audio clip are displayed on the video editing track of the video editor, in which the second target video clip has the same track timeline interval as the target audio clip; and generating a second video based on the third video editing data.

According to one or more embodiments of the present disclosure, the present disclosure provides a video generation method. The method further includes: displaying a video production page in response to a triggering operation on a video production control, in which the video production page includes a first control, a second control, and a text editing region, the first control is configured to trigger the first instruction in response to a triggering operation of a user, the second control is configured to trigger the third instruction in response to a triggering operation of a user, and the text editing region is configured for acquiring an input text in response to an editing operation of a user.

According to one or more embodiments of the present disclosure, the present disclosure provides a video generation method. That acquiring the input text in response to an editing operation of a user includes: displaying a text input page in response to a triggering operation on the text editing region; and acquiring, in response to an input operation on the text input page, the input text corresponding to the input operation.

According to one or more embodiments of the present disclosure, the present disclosure provides a video generation method. The text editing region includes a network address copy control, and acquiring the input text in response to an editing operation of a user includes: displaying a network address enter region in response to a triggering operation on the network address copy control; receiving, in response to an input operation on the network address enter region, a network address corresponding to the input operation; and acquiring the input text corresponding to the network address.

According to one or more embodiments of the present disclosure, the present disclosure provides a video generation method. That acquiring the input text corresponding to the network address includes: determining whether an original input text exists in the text editing region; and if the original input text exists in the text editing region, deleting the original input text and acquiring the input text corresponding to the network address.

According to one or more embodiments of the present disclosure, the present disclosure provides a video generation method, in which after in response to a triggering operation on the video production control, the method further includes: acquiring a network address carried on a clipboard; acquiring an input text corresponding to the network address; and displaying a video production page, in which the video production page includes a text editing region for displaying the input text corresponding to the network address.

According to one or more embodiments of the present disclosure, the present disclosure provides a video generation apparatus. The apparatus includes: a first video editing data determination module, which is configured to, in response to a first instruction triggered for an input text, generate first video editing data based on the input text, in which the first video editing data includes at least one first video clip and at least one audio clip, the at least one first video clip and the at least one audio clip respectively correspond to at least one text clip divided from the input text, a target video clip among the at least one first video clip and a target audio clip among the at least one audio clip respectively corresponds to a target text clip among the at least one text clip, the target audio clip is configured to be filled with a reading speech that matches the target text clip, and the first target video clip is a vacant clip; a first video editing data import module, which is configured to import the first video editing data in a video editor so that the at least one first video clip and the at least one audio clip are displayed on a video editing track of the video editor, in which the first target video clip has the same track timeline interval as the target audio clip; a second video editing data determination module, which is configured to, in response to triggering a second instruction for the first target video clip on the video editor, fill the first target video clip with a first target video based on the first video editing data, to obtain second video editing data, in which the first target video is a video obtained based on a first target image material indicated by the second instruction; and a first target video generation module, which is configured to generate a first video based on the second video editing data.

According to one or more embodiments of the present disclosure, the present disclosure provides a video generation apparatus, in which the first video editing data includes at least one subtitles clip, a target subtitles clip among the at least one subtitles clip corresponds to the target text clip among the at least one text clip, and the target subtitles clip is configured to fill text subtitles that match the target text clip.

According to one or more embodiments of the present disclosure, the present disclosure provides a video generation apparatus. The apparatus further includes: a third video editing data generation module, which is configured to, in response to a third instruction triggered for the input text, generate third video editing data based on the input text, in which the third video editing data includes at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip; a third video editing data import module, which is configured to import the third video editing data in the video editor so that the at least one second video clip and the at least one audio clip are displayed on the video editing track of the video editor, in which the second target video clip has the same track timeline interval as the target audio clip; and a second video generation module, which is configured to generate a second video based on the third video editing data.

According to one or more embodiments of the present disclosure, the present disclosure provides a video generation apparatus. The apparatus further includes a video production page display module, which is configured to display a video production page in response to a triggering operation on a video production control, the video production page includes a first control, a second control, and a text editing region, the first control is configured to trigger the first instruction in response to a triggering operation of a user, the second control is configured to trigger the third instruction in response to a triggering operation of a user, and the text editing region is configured for acquiring the input text in response to an editing operation of a user.

According to one or more embodiments of the present disclosure, the present disclosure provides a video generation apparatus, in which acquiring the input text in response to an editing operation of a user includes: displaying a text input page in response to a triggering operation on the text editing region; and acquiring, in response to an input operation on the text input page, the input text corresponding to the input operation.

According to one or more embodiments of the present disclosure, the present disclosure provides a video generation apparatus, in which the text editing region includes a network address copy control, and acquiring the input text in response to an editing operation of a user includes: displaying a network address enter region in response to a triggering operation on the network address copy control; receiving, in response to an input operation on the network address enter region, a network address corresponding to the input operation; and acquiring the input text corresponding to the network address.

According to one or more embodiments of the present disclosure, the present disclosure provides a video generation apparatus, in which acquiring the input text corresponding to the network address includes: determining whether an original input text exists in the text editing region; and if the original input text exists in the text editing region, deleting the original input text, and acquiring the input text corresponding to the network address.

According to one or more embodiments of the present disclosure, the present disclosure provides a video generation apparatus, in which after in response to a triggering operation on the video production control, further including: acquiring a network address carried on a clipboard; acquiring an input text corresponding to the network address; and displaying a video production page, in which the video production page includes a text editing region for displaying the input text corresponding to the network address.

According to one or more embodiments of the present disclosure, the present disclosure provides an electronic device, including:

one or more processors; and a memory for storing one or more programs;

when the one or more programs are executed by the one or more processors, causing the one or more processors to implement any of the video generation methods provided in the present disclosure.

According to one or more embodiments of the present disclosure, the present disclosure provides a computer-readable storage medium, in which a computer program is stored, and when executed by a processor, the program implements any of the video generation methods provided in the present disclosure.

An embodiment of the present disclosure further provides a computer program product including a computer program/instruction, and when executed by a processor, the computer program/instruction implements the video generating methods described above.

The foregoing descriptions are merely preferred examples of the present disclosure and explanations of the technical principles used. Persons skilled in the art should understand that the related scope disclosed in the present disclosure is not limited to the technical solutions formed by a specific combination of the foregoing technical characteristics, and should also cover other technical solutions formed by any combination of the foregoing technical features or their equivalent features without departing from the above disclosed conception. For example, the technical solution formed by replacement between the foregoing features and technical features having similar functions disclosed (but not limited thereto) in the present disclosure.

Additionally, although operations are depicted in a particular order, this should be understood that such operations are required to be performed in the particular order illustrated or in a sequential order. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method of generating videos based on input texts, comprising:

receiving text input by a user;

in response to a first instruction triggered for the input text, generating first video editing data based on the input text, wherein the first instruction is indicative of generating the first video editing data based on the input text only, the first video editing data comprises at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip divided from the input text, and the first target video clip is a vacant clip;

importing the first video editing data in a video editor so that the at least one first video clip and an audio track associated with the at least one audio clip are displayed on a video editing track of the video editor, wherein the first target video clip has a same track timeline interval as the target audio clip;

in response to triggering a second instruction for the first target video clip on the video editor, filling the first target video clip with a first target video to obtain second video editing data, wherein the second instruction indicates a first target image material, and the first target video is a video obtained based on the first target image material; and generating a first video based on the target audio clip filled with the reading speech and the first target video clip filled with the video obtained based on the first target image material.

2. The method according to claim 1, wherein the first video editing data comprises at least one subtitles clip, a target subtitles clip among the at least one subtitles clip corresponds to the target text clip among the at least one text clip, and the target subtitles clip is configured to fill text subtitles that match the target text clip.

3. The method according to claim 1, further comprising:

in response to a third instruction triggered for the input text, generating third video editing data based on the input text, wherein the third video editing data comprises at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip;

importing the third video editing data in the video editor so that the at least one second video clip and the audio track associated with the at least one audio clip are displayed on the video editing track of the video editor, wherein the second target video clip has a same track timeline interval as the target audio clip; and generating a second video based on the third video editing data.

4. The method according to claim 2, further comprising:

in response to a third instruction triggered for the input text, generating third video editing data based on the input text, wherein the third video editing data comprises at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip;

importing the third video editing data in the video editor so that the at least one second video clip and the audio track associated with the at least one audio clip are displayed on the video editing track of the video editor, wherein the second target video clip has a same track timeline interval as the target audio clip; and generating a second video based on the third video editing data.

5. The method according to claim 3, further comprising:

displaying a video production page in response to a triggering operation on a video production control, wherein the video production page comprises a first control, a second control, and a text editing region, the first control is configured to trigger the first instruction in response to a triggering operation, the second control is configured to trigger the third instruction in response to a triggering operation, and the text editing region is configured for acquiring the input text in response to an editing operation.

6. The method according to claim 4, further comprising:

displaying a video production page in response to a triggering operation on a video production control, wherein the video production page comprises a first control, a second control, and a text editing region, the first control is configured to trigger the first instruction in response to a triggering operation, the second control is configured to trigger the third instruction in response to a triggering operation, and the text editing region is configured for acquiring the input text in response to an editing operation.

7. The method according to claim 5, wherein acquiring the input text in response to an editing operation comprises:

displaying a text input page in response to a triggering operation on the text editing region and acquiring, in response to an input operation on the text input page, the input text corresponding to the input operation.

8. The method according to claim 5, wherein the text editing region comprises a network address copy control, and acquiring the input text in response to an editing operation comprises:

displaying a network address enter region in response to a triggering operation on the network address copy control;

receiving, in response to an input operation on the network address enter region, a network address corresponding to the input operation; and acquiring the input text corresponding to the network address.

9. The method according to claim 8, wherein acquiring the input text corresponding to the network address comprises:

determining whether an original input text exists in the text editing region; and if the original input text exists in the text editing region, deleting the original input text and acquiring the input text corresponding to the network address.

10. The method according to claim 8, wherein after in response to a triggering operation on the video production control, the method further comprises:

acquiring a network address carried on a clipboard;

acquiring an input text corresponding to the network address; and displaying a video production page, wherein the video production page comprises a text editing region for displaying the input text corresponding to the network address.

11. An electronic device, comprising:

one or more processors; and a storage apparatus, configured to store one or more programs, wherein the one or more programs, when executed by the one or more processors, cause the one or more processors to implement a video generation method, and the method comprises:

receiving text input by a user;

in response to a first instruction triggered for the input text, generating first video editing data based on the input text, wherein the first instruction is indicative of generating the first video editing data based on the input text only, the first video editing data comprises at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip divided from the input text, and the first target video clip is a vacant clip;

importing the first video editing data in a video editor so that the at least one first video clip and an audio track associated with the at least one audio clip are displayed on a video editing track of the video editor, wherein the first target video clip has a same track timeline interval as the target audio clip;

in response to triggering a second instruction for the first target video clip on the video editor, filling the first target video clip with a first target video to obtain second video editing data, wherein the second instruction indicates a first target image material, and the first target video is a video obtained based on the first target image material; and generating a first video based on the target audio clip filled with the reading speech and the first target video clip filled with the video obtained based on the first target image material.

12. The electronic device according to claim 11, wherein the first video editing data comprises at least one subtitles clip, a target subtitles clip among the at least one subtitles clip corresponds to the target text clip among the at least one text clip, and the target subtitles clip is configured to fill text subtitles that match the target text clip.

13. The electronic device according to claim 11, wherein the method further comprises:

in response to a third instruction triggered for the input text, generating third video editing data based on the input text, wherein the third video editing data comprises at least one second video clip and at least one audio clip, the at least one second video clip and the at least one audio clip respectively correspond to at least one text clip divided from the input text, a second target video clip among the at least one second video clip and a target audio clip among the at least one audio clip respectively corresponds to a target text clip among the at least one text clip, the second target video clip is a video obtained based on a second target image material, and the second target image material matches the target text clip;

importing the third video editing data in the video editor so that the at least one second video clip and the audio track associated with the at least one audio clip are displayed on the video editing track of the video editor, wherein the second target video clip has a same track timeline interval as the target audio clip; and generating a second video based on the third video editing data.

14. The electronic device according to claim 13, wherein the method further comprises:

displaying a video production page in response to a triggering operation on a video production control, wherein the video production page comprises a first control, a second control, and a text editing region, the first control is configured to trigger the first instruction in response to a triggering operation, the second control is configured to trigger the third instruction in response to a triggering operation, and the text editing region is configured for acquiring the input text in response to an editing operation.

15. The electronic device according to claim 14, wherein acquiring the input text in response to an editing operation comprises:

displaying a text input page in response to a triggering operation on the text editing region; and acquiring, in response to an input operation on the text input page, the input text corresponding to the input operation.

16. The electronic device according to claim 14, wherein the text editing region comprises a network address copy control, and acquiring the input text in response to an editing operation comprises:

displaying a network address enter region in response to a triggering operation on the network address copy control;

receiving, in response to an input operation on the network address enter region, a network address corresponding to the input operation; and acquiring the input text corresponding to the network address.

17. The electronic device according to claim 16, wherein acquiring the input text corresponding to the network address comprises:

determining whether an original input text exists in the text editing region; and if the original input text exists in the text editing region, deleting the original input text and acquiring the input text corresponding to the network address.

18. The electronic device according to claim 16, wherein after in response to a triggering operation on the video production control, the method further comprises:

acquiring a network address carried on a clipboard;

acquiring an input text corresponding to the network address; and

27 displaying a video production page, wherein the video production page comprises a text editing region for displaying the input text corresponding to the network address.

19. A non-transitory computer-readable storage medium, storing a computer program, wherein the computer program, when executed by a processor, implements operations comprising:

receiving text input by a user;

in response to a first instruction triggered for the input text, generating first video editing data based on the input text, wherein the first instruction is indicative of generating the first video editing data based on the input text only, the first video editing data comprises at least one first video clip and at least one audio clip, the at least one first video clip and the at least one audio clip respectively correspond to at least one text clip divided from the input text, a first target video clip among the at least one first video clip and a target audio clip among the at least one audio clip respectively corresponds to a target text clip among the at least one text clip, the target audio clip is configured to be filled with a reading speech that matches the target text clip divided from the input text, and the first target video clip is a vacant clip;

importing the first video editing data in a video editor so that the at least one first video clip and an audio track associated with the at least one audio clip are displayed on a video editing track of the video editor, wherein the first target video clip has a same track timeline interval as the target audio clip;

in response to triggering a second instruction for the first target video clip on the video editor, filling the first target video clip with a first target video to obtain second video editing data, wherein the second instruction indicates a first target image material, and the first target video is a video obtained based on the first target image material; and generating a first video based on the target audio clip filled with the reading speech and the first target video clip filled with the video obtained based on the first target image material.

* * * * *